(12) United States Patent
Abe et al.

(10) Patent No.: US 10,165,212 B2
(45) Date of Patent: Dec. 25, 2018

(54) SOLID-STATE IMAGING DEVICE HAVING VOLTAGE LINES INCLUDING OPENINGS CORRESPONDING TO PIXEL UNITS

(71) Applicant: SONY CORPORATION, Tokyo (JP)

(72) Inventors: Takashi Abe, Kanagawa (JP); Nobuo Nakamura, Kanagawa (JP); Tomoyuki Umeda, Kanagawa (JP); Keiji Mabuchi, Kanagawa (JP); Hiroaki Fujita, Kanagawa (JP); Eiichi Funatsu, Tokyo (JP); Hiroki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/679,839

(22) Filed: Aug. 17, 2017

(65) Prior Publication Data

US 2018/0041725 A1    Feb. 8, 2018

Related U.S. Application Data

(60) Continuation of application No. 15/160,575, filed on May 20, 2016, now Pat. No. 9,832,405, which is a continuation of application No. 14/864,169, filed on Sep. 24, 2015, now Pat. No. 9,374,505, which is a
(Continued)

(30) Foreign Application Priority Data

Nov. 20, 2002    (JP) .................................. 2002-336252

(51) Int. Cl.
*H04N 5/374*    (2011.01)
*H04N 3/14*    (2006.01)
(Continued)

(52) U.S. Cl.
CPC ............. *H04N 5/374* (2013.01); *H04N 3/155* (2013.01); *H04N 5/335* (2013.01); *H04N 5/378* (2013.01);
(Continued)

(58) Field of Classification Search
CPC ........ H01L 27/14609; H01L 27/14641; H04N 5/378; H04N 9/045
See application file for complete search history.

(56) References Cited

U.S. PATENT DOCUMENTS 6,072,206 A * 6/2000 Yamashita ........ H01L 27/14609
257/292
6,674,470 B1 * 1/2004 Tanaka ................... H04N 3/155
348/302
(Continued)

*Primary Examiner* — Amy Hsu
(74) *Attorney, Agent, or Firm* — Sheridan Ross P.C.

(57) ABSTRACT

A solid-state imaging device is capable of simplifying the pixel structure to reduce the pixel size and capable of suppressing the variation in the characteristics between the pixels when a plurality of output systems is provided. A unit cell includes two pixels. Upper and lower photoelectric converters and, transfer transistors and connected to the upper and lower photoelectric converters, respectively, a reset transistor, and an amplifying transistor form the two pixels. A full-face signal line is connected to the respective drains of the reset transistor and the amplifying transistor. Controlling the full-face signal line, along with transfer signal lines and a reset signal line, to read out signals realizes the simplification of the wiring in the pixel, the reduction of the pixel size, and so on.

6 Claims, 13 Drawing Sheets

Related U.S. Application Data continuation of application No. 13/910,859, filed on Jun. 5, 2013, now Pat. No. 9,185,369, which is a continuation of application No. 12/685,515, filed on Jan. 11, 2010, now Pat. No. 8,482,643, which is a division of application No. 10/535,366, filed as application No. PCT/JP03/14718 on Nov. 19, 2003, now Pat. No. 7,671,912.

(51) Int. Cl.
*H04N 9/04* (2006.01)
*H04N 5/335* (2011.01)
*H04N 5/378* (2011.01)
*H04N 5/3745* (2011.01)
*H04N 5/376* (2011.01)

(52) U.S. Cl.
CPC ......... *H04N 5/3741* (2013.01); *H04N 5/3765* (2013.01); *H04N 5/37457* (2013.01); *H04N 9/045* (2013.01)

(56) References Cited

U.S. PATENT DOCUMENTS

| | | | | |
|---|---|---|---|---|
| 6,894,721 | B1* | 5/2005 | Okada | H04N 9/045 348/229.1 |
| 6,977,684 | B1* | 12/2005 | Hashimoto | H01L 27/14603 250/208.1 |
| 7,538,805 | B2* | 5/2009 | Kubo | H04N 5/335 348/251 |
| 2001/0028401 | A1* | 10/2001 | Miyashita | H04N 5/353 348/311 |
| 2002/0122130 | A1* | 9/2002 | Yamaguchi | H01L 27/14603 348/308 |
| 2003/0090924 | A1* | 5/2003 | Nii | G11C 15/04 365/102 |
| 2005/0062866 | A1* | 3/2005 | Ang | H04N 5/23241 348/302 |
| 2005/0068441 | A1* | 3/2005 | Parks | H04N 3/1575 348/311 |

\* cited by examiner

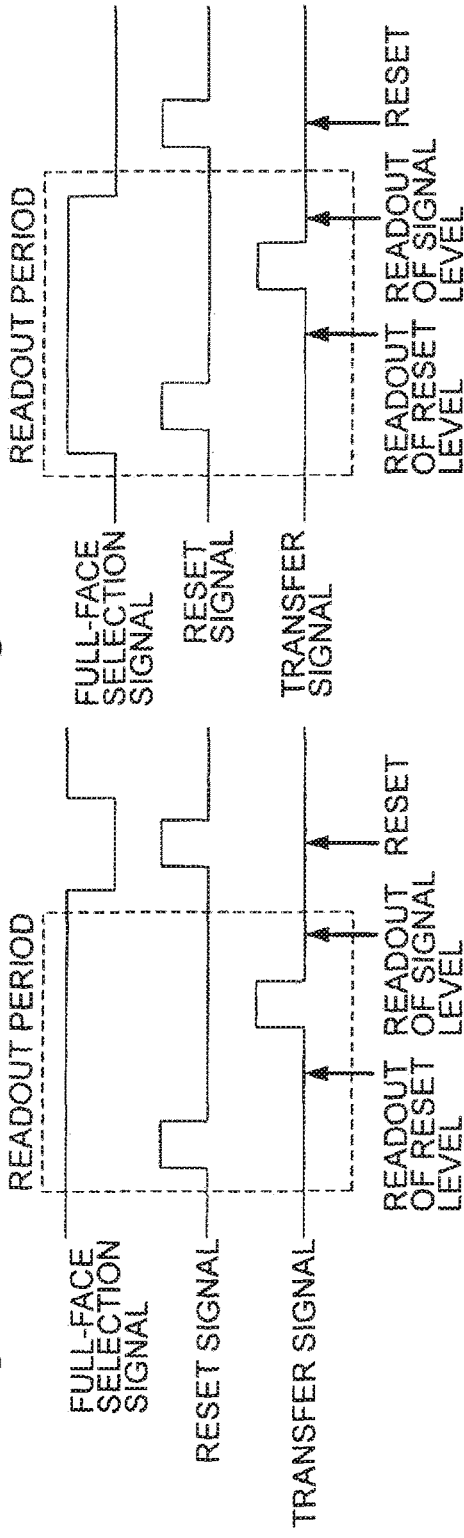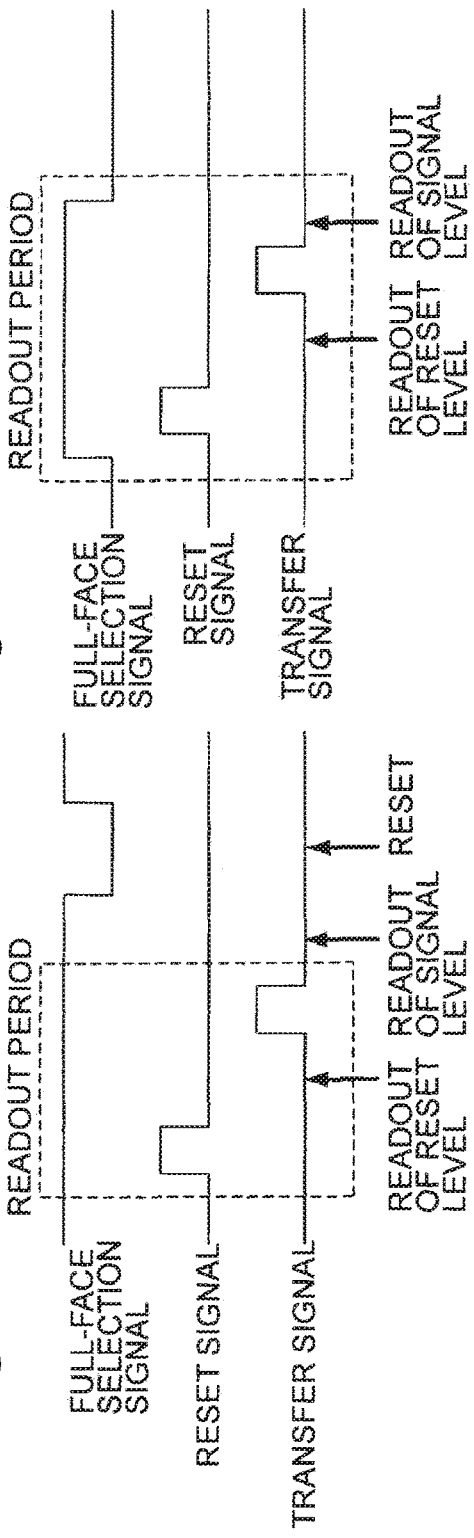

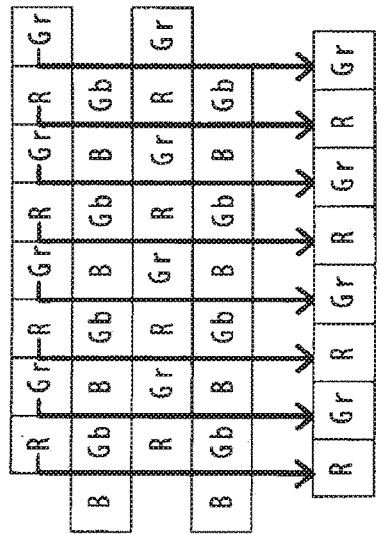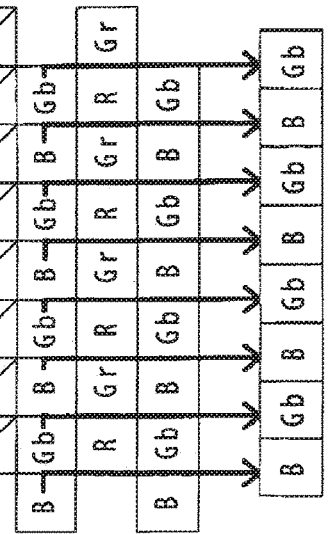
Fig.6B
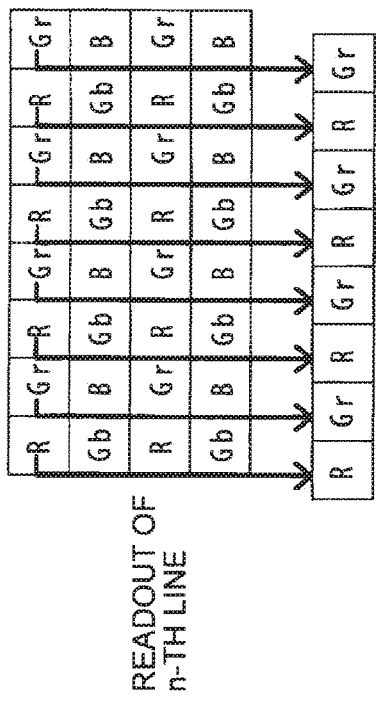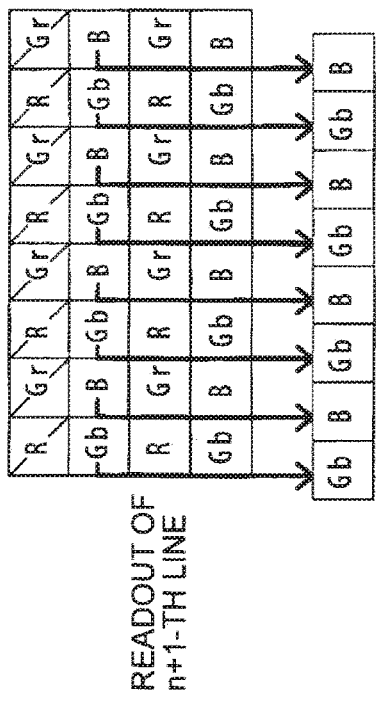
Fig.6A

SOLID-STATE IMAGING DEVICE HAVING VOLTAGE LINES INCLUDING OPENINGS CORRESPONDING TO PIXEL UNITS

CROSS-REFERENCE TO RELATED APPLICATIONS

This application claims priority to and is a continuation of U.S. patent application Ser. No. 15/160,575, filed May 20, 2016, which is a continuation of U.S. patent application Ser. No. 14/864,169 filed Sep. 24, 2015, now U.S. Pat. No. 9,374,505, which is a continuation of U.S. patent application Ser. No. 13/910,859 filed Jun. 5, 2013, which is a continuation of U.S. application Ser. No. 12/685,515 filed Jan. 11, 2010, now issued as U.S. Pat. No. 8,482,643 issued Jul. 9, 2013, which is a divisional of U.S. application Ser. No. 10/535,366 filed May 18, 2005, now issued as U.S. Pat. No. 7,671,912 issued Mar. 2, 2010, which claims priority to PCT/JP03/14718 filed Nov. 19, 2003, now expired, the disclosure of which is incorporated herein by reference to the extent permitted by law.

TECHNICAL FIELD

The present invention relates to a solid-state imaging device, such as a complementary metal-oxide semiconductor (CMOS) image sensor, having a photoelectric converter and a plurality of pixel transistors for every pixel in a two-dimensional array.

BACKGROUND ART

FIG. 8 is a circuit diagram showing an example of the pixel structure used in a known CMOS image sensor.

Referring to FIG. 8, each pixel includes a photoelectric converter 1 and a plurality of transistors 2, 3, 4, and 6.

The photoelectric converter 1, such as a photodiode, receives light and stores signal charge.

The transistor 2 amplifies the signal charge (hereinafter referred to as the amplifying transistor 2). The transistor 3 transfers the signal charge stored in the photoelectric converter 1 to the gate electrode of the amplifying transistor 2 (hereinafter referred to as the transfer transistor 3).

The transistor 4 resets the voltage of the gate electrode of the amplifying transistor 2 (hereinafter referred to as the reset transistor 4).

A signal line 5 is used for supplying a power-supply voltage (hereinafter referred to as the power-supply voltage supply line 5). The drains of the reset transistor 4 and the amplifying transistor 2 are connected to the power-supply voltage supply line 5.

The transistor 6 selects an output pixel (hereinafter referred to as the selection transistor 6). A signal line 7 is used for outputting a pixel signal (hereinafter referred to as the pixel output line 7).

An external transistor 8 supplies a constant current to the pixel output line (hereinafter referred to as the constant-current supply transistor 8). The constant-current supply transistor 8 supplies a constant current to the amplifying transistor 2 in a selected pixel to cause the amplifying transistor 2 to serve as a source follower, so that a voltage differing from the voltage of the gate electrode of the amplifying transistor 2 by a predetermined value is applied to the pixel output line 7.

A signal line 9 is a transfer signal line used for controlling the voltage of the gate electrode of the transfer transistor 3 (hereinafter referred to as the transfer signal line 9). A signal line 10 is a reset signal line used for controlling the voltage of the gate electrode of the reset transistor 4 (hereinafter referred to as the reset signal line 10). A signal line 11 is a selection signal line used for controlling the voltage of the gate electrode of the selection transistor 6 (hereinafter referred to as the selection signal line 11). A signal line 12 is a constant-voltage supply line used for supplying a predetermined voltage to the gate electrode of the constant-current supply transistor 8 such that the constant-current supply transistor 8 performs a saturation region operation to supply a predetermined current (hereinafter referred to as the constant-voltage supply line 12).

A terminal 13 is a pulse terminal through which a transfer pulse is supplied to each transfer signal line 9, and is connected to one input port of each line-selection AND element 14. An output from vertical selection means 15 is supplied to the other input port of the line-selection AND element 14. The output port of the line-selection AND element 14 is connected to the transfer signal line 9.

A terminal 16 is a pulse terminal through which a reset pulse is supplied to each reset signal line 10, and is connected to one input port of each line-selection AND element 17. The output from the vertical selection means 15 is supplied to the other input port of the line-selection AND element 17. The output port of the line-selection AND element 17 is connected to the reset signal line 10.

A terminal 18 is a pulse terminal through which a selection pulse is supplied to each selection signal line 11, and is connected to one input port of each line-selection AND element 19. The output from the vertical selection means 15 is supplied to the other input port of the line-selection AND element 19. The output port of the line-selection AND element 19 is connected to the selection signal line 11.

In the structure described above, the control pulses are supplied only to the signal lines of a pixel line selected by the vertical selection means 15.

A readout operation from each pixel is performed in a manner described below with drive signals shown in FIG. 9 being supplied.

Referring to FIG. 9, a selection signal is supplied to the selection signal line 11 in FIG. 8, a reset signal is supplied to the reset signal line 10 in FIG. 8, and a transfer signal is supplied to the transfer signal line 9 in FIG. 8.

First, the selection transistor 6 and the reset transistor 4 in the pixel line for which the readout operation is to be performed are brought into conduction to reset the gate electrode of the amplifying transistor 2. After the reset transistor 4 is brought out of conduction, a voltage corresponding to the reset level of each pixel is supplied to a downstream correlated double sampling (CDS) circuit 20.

Next, the transfer transistor 3 is brought into conduction and the electric charge stored in the photoelectric converter 1 is transferred to the gate electrode of the amplifying transistor 2. After the transfer is completed and the transfer transistor 3 is brought out of conduction, a voltage having the signal level corresponding to the amount of stored charge is supplied to the downstream CDS circuit 20.

The CDS circuit 20 measures the difference between the reset level that has been read out and the signal level and suppresses a fixed pattern noise produced due to, for example, the variation in the threshold (Vth) of the transistor read out for every pixel.

The signal stored in the CDS circuit 20 is selected by column selection means 21 and is read out in a downstream circuit, such as an automatic gain control (AGC), through a horizontal signal line 22 for processing.

As described above, each pixel in the CMOS image sensor must include the various transistors and the control signal lines for reading out the electric charge stored in the photoelectric converter, in addition to the photoelectric converter.

Accordingly, it is difficult to reduce the pixel size in the CMOS image sensor, compared with a charge coupled device (CCD) image sensor having a simple pixel structure.

Consequently, a solid-state imaging device that eliminates the use of a selection transistor, as shown in FIG. 11, by changing the drive method of the pixel circuit to simplify the pixel structure is proposed (for example, Japanese Unexamined Patent Application Publication No. 2002-077731).

Alternatively, for example, as shown in FIG. 12, a metal oxide semiconductor (MOS) image pickup device in which one amplifying transistor is shared between a plurality of photoelectric converters for readout is proposed (for example, WO97/07630).

Specifically, in pixels shown in FIG. 12, the outputs from the two photoelectric converters in the two adjoining pixels are supplied to the gate electrode of one amplifying transistor 2 through the transfer transistors 3. Sequentially controlling the transfer transistor 3 and the reset transistor 4 outputs two pixel signals from the amplifying transistor 2.

The MOS image pickup device is structured such that a capacitor 23 is connected to the gate electrode of the amplifying transistor 2 and a kick pulse is supplied through a capacitor kick line 24 to control the voltage at the gate electrode.

In the related art shown in FIG. 12, sharing the amplifying transistor can decrease the number of elements in one pixel to reduce the pixel size. However, all the pixels in the pixel array have the same shape in the unit cell (including one pixel) shown in FIGS. 8 and 11, whereas the pixel array having the unit cells (pairs of pixels sharing the amplifying transistor), shown in FIG. 12, includes the two kind of pixels.

Since the two kinds of pixels have different arrangements of elements, there are differences in characteristics, such as the sensitivity and the saturation, between the two kinds of pixels.

For example, when color coding is performed in a Bayer format, the pixels coded in G have different characteristics for every line. As a result, there is a problem in that horizontal stripes are drawn in one image.

This problem involves not only the unit cells in FIG. 12 but also the sharing of the transistors between the pixels, regardless of the number or arrangement of the transistors.

Since the capacitor 23 is provided only in the lower pixel in FIG. 12, for example, incident light is shaded due to the capacitor 23 or the light receiving area is reduced in size due to the occupancy of the capacitor 23 to decrease the quantity of incident light. Accordingly, the sensitivity in the lower pixel becomes lower than that in the upper pixel.

Furthermore, the two kinds of pixels differ from each other in the arrangement of the transfer transistor for reading out the electric charge subjected to the photoelectric conversion and, also, in the direction of reading out the electric charge. The difference in arrangement of the transfer transistor, the arrangement determining the direction of reading out the electric charge, causes a difference in sensitivity between the two kinds of pixels. This is because, for example, the effect of the potential of the transfer transistor on the potential of the light receiving section occurs in different positions in the two kinds of pixels and, therefore, the two kinds of pixels possibly differ from each other in the photoelectric conversion efficiency of light being incident from the same direction or the amount of stored charge.

In a known readout method, for example, a signal output read out from each pixel to the CDS circuit is processed in one output system (the horizontal signal line, the AGC, an analog-to-digital converter (ADC), etc.) to be converted into a digital signal and, then, the digital signal is processed in inner and external circuits and extracted.

However, in recent years, in response to the need for a solid-state imaging device capable of performing sampling at a higher speed, a method of dividing signal outputs, read out from each pixel to the CDS circuit, into two output systems for processing, as shown in FIG. 13, is proposed.

FIG. 13 shows an example of the overall structure of a CMOS image sensor. Referring to FIG. 13, the CMOS image sensor includes a sensor 111 including the pixel array described above, a vertical drive circuit 112, a shutter drive circuit 113, a CDS circuit 114, a horizontal drive circuit 115, a timing generator 116, AGC circuits 117A and 117B, ADC circuits 118A and 118B, and so on. The CMOs image sensor is structured such that signals are output through two horizontal signal lines 119A and 119B, the AGC circuits 117A and 117B, and the ADC circuits 118A and 118B.

The division of the output system into two halves the load on one horizontal signal line, so that it is possible to perform the readout at double speed, compared with a known image sensor having one output system.

However, it is not possible to make the characteristics of the elements in the two output systems equal in terms of processing. In other words, since the output systems include analog circuits, such as the AGC and the ADC, which differ in gain, noise characteristics, or the like, signals that are slightly different from each other are output after signal processing even when the same signals are input.

Particularly, in the solid-state imaging device in question, analog signals having low levels of the order of a few millivolts to ten to the minus first power millivolts are processed as the signals output from the pixels and, thus, the difference in the characteristics between the output systems causes a large problem.

For example, FIG. 14 illustrates a manner in which signals are read out from an imager using a Bayer color filter through two output systems.

In the Bayer array shown in FIG. 14, RG lines having R pixels and Gr pixels alternatively arranged are arranged adjacent to GB lines having Gb pixels and B pixels alternately arranged.

In the readout from the RG line (the n-th line) in FIG. 14, the signals are read out from the R pixels through an output system A and are read out from the Gr pixels through an output system B.

In the readout from the GB line (the n+1-th line) in FIG. 14, the signals are read out from the Gb pixels through the output system A and are read out from the B pixels through the output system B.

In other words, the signals are read out from the R pixels and the Gb pixels through the output system A, and the signals are read out from the B pixels and the or pixels through the output system B.

Since the signals read out from the R, G, and B pixels are subjected to signal processing, such as adjustment of color balance, for every color downstream, a small difference between the R, G, and B pixels due to the output systems does not cause a large problem.

However, when there is a small difference between the Gr and Gb pixels, which are processed through the different output systems while being processed as the same G pixels, the signals periodically vary in the line direction, thus possibly resulting in horizontal stripes in one image.

Accordingly, it is an object of the present invention to provide a solid-state imaging device capable of simplifying the pixel structure to reduce the pixel size and capable of suppressing the variation in the characteristics between the pixels when a plurality of output systems is provided.

DISCLOSURE OF INVENTION

In order to achieve the above object, the present invention provides a solid-state imaging device including an imaging area having a plurality of unit cells in a two-dimensional array, each unit cell including a group of a predetermined number of pixels; and signal lines used for selecting the pixels. The unit cell includes a plurality of photoelectric converters corresponding to the pixels; amplifying means, shared by the pixels, for amplifying a signal read out from each photoelectric converter and outputting the amplified signal; and transfer means for selectively reading out the signal from the photoelectric converter and supplying the readout signal to the amplifying means. The signal line used for driving the amplifying means is a full-face signal line shared by all the pixels and driving the full-face signal line allows the signal to be read out from each pixel.

The present invention characterized in that the unit cells are shifted from each other in the column direction by one pixel or by an amount smaller than one pixel for every pixel column in the imaging area.

The present invention provides a solid-state imaging device including an imaging area having a plurality of unit cells in a two-dimensional array, each unit cell including a group of a predetermined number of pixels; and signal lines used for selecting the pixels. The unit cell includes a plurality of photoelectric converters corresponding to the pixels; amplifying means, shared by the pixels, for amplifying a signal read out from each photoelectric converter and outputting the amplified signal; and transfer means for selectively reading out the signal from the photoelectric converter and supplying the readout signal to the amplifying means. The photoelectric converters in the unit cells are arranged so as to be diagonally adjacent to each other.

The solid-state imaging device according to the present invention shares the transistors between pixels and uses the full-face signal line to decrease the number of transistors and the number of signal lines for every pixel, thus reducing the pixel size.

Furthermore, with respect to the difference in characteristics between the pixels having different shapes and the difference in gain between the two output systems, which are problem of sharing the transistors between the pixels, devising the arrangement of the unit cells or sharing the transistors between the two diagonally adjoining pixels can narrow the difference in the characteristics of the signals between the pixels, particularly between the pixels filtered with the G filter.

BRIEF DESCRIPTION OF THE DRAWINGS

FIGS. 3A to 3D are timing charts showing how drive signals are supplied when signals are read out from the pixels in the pixel structure in FIG. 1.

FIGS. 6A and 6B illustrate operations examples when the signals are read out to one output system in the pixel structure in FIG. 5.

BEST MODE FOR CARRYING OUT THE INVENTION

Embodiments of a solid-state imaging device according to the present invention will be described below.

The solid-state imaging device according to an embodiment of the present invention is structured, as in a CMOS image sensor, so as to include a photoelectric converter and a plurality of transistors for every pixel, to form a two-dimensional pixel array having a plurality of pixels, and to provide a plurality of signal lines for driving the pixels. In this structure, transistors are shared between pixels and a full-face signal line is used to form a unit cell (a pair of pixels sharing the transistors) in order to decrease the number of elements and control lines for every pixel to reduce the pixel size.

In addition, the arrangement of the unit cells in which the transistors are shared between the pixels is varied and the pixels filtered in the same color are formed in the same shape in order to uniform the characteristics of the pixels filtered in the same color.

The transistors are shared between diagonally adjoining pixels in order to read out signals from the pixels filtered in the same color through the same output system even when the output system is divided into two.

Specific embodiments of the present invention will be described below with reference to the attached drawings.

First Embodiment

Figure 1:
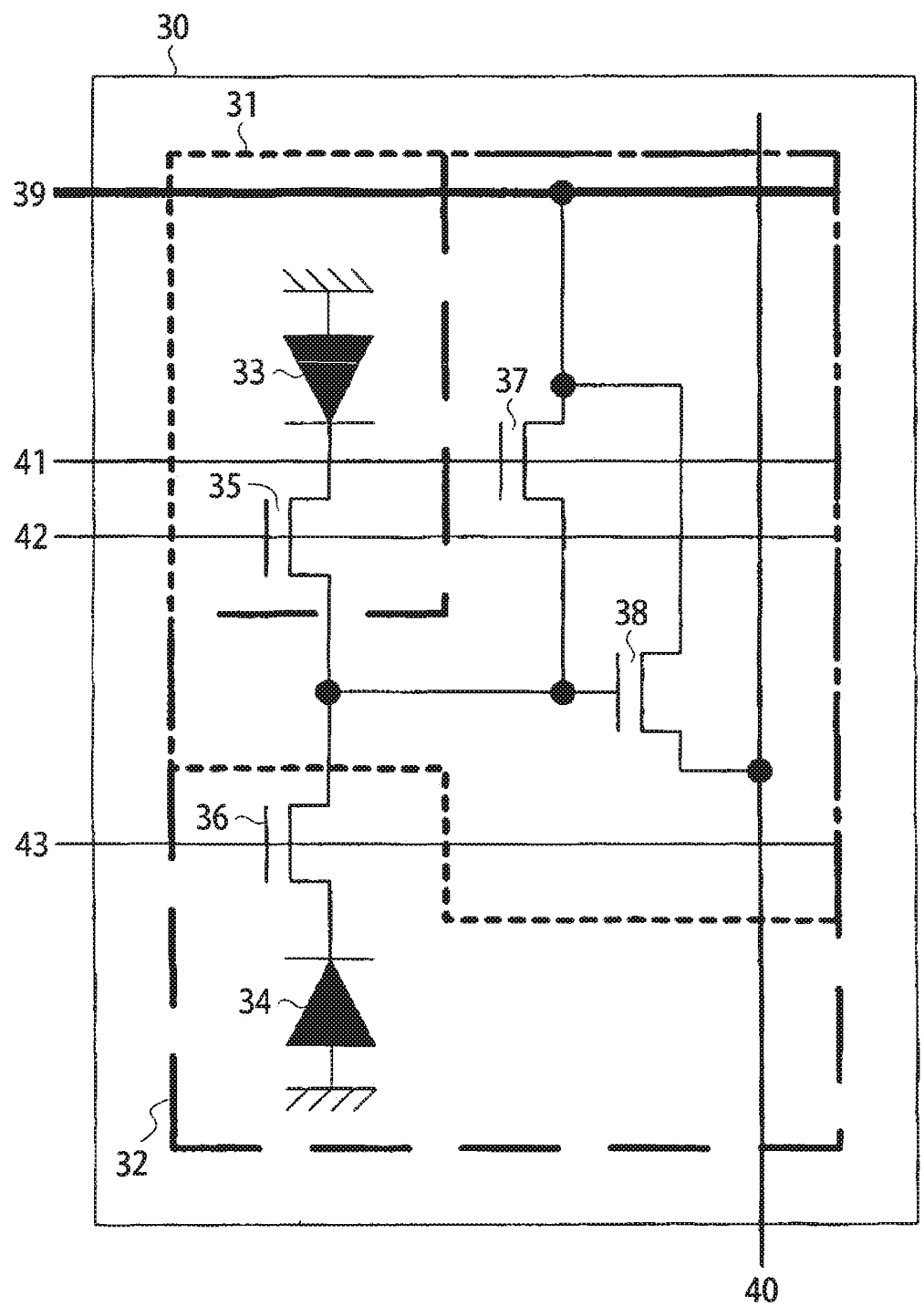
FIG. 1 is a circuit diagram showing a pixel structure according to a first embodiment of the present invention.

FIG. 1 is a circuit diagram showing a pixel structure in which transistors are shared between upper and lower pixels, according to a first embodiment of the present invention.

Referring to FIG. 1, an area surrounded by a solid line denotes a unit cell 30. The unit cell 30 includes a pixel 31 (an area surrounded by a small-spacing dotted line) and a pixel 32 (an area surrounded by a large-spacing broken line).

In the unit cell 30, upper and lower photoelectric converters 33 and 34, transfer transistors 35 and 36 connected to the upper and lower photoelectric converters 33 and 34, respectively, a reset transistor 37, and an amplifying transistor 38 form the two pixels.

A signal line 39 is a full-face signal line (hereinafter referred to as the full-face signal line 39) and is connected to the drains of the reset transistor 37 and the amplifying transistor 38.

A signal line 40 is a pixel output line (hereinafter referred to as the pixel output line 40). A signal line 41 is a reset signal line used for controlling the voltage of the gate electrode of the reset transistor 37 (hereinafter referred to as the reset signal line 41).

A signal line 42 is a transfer signal line used for controlling the voltage of the gate electrode of the transfer transistor 35 (hereinafter referred to as the transfer signal line 42). A signal line 43 is a transfer signal line used for controlling the transfer transistor 36 (hereinafter referred to as the transfer constant signal line 43).

Figure 2:
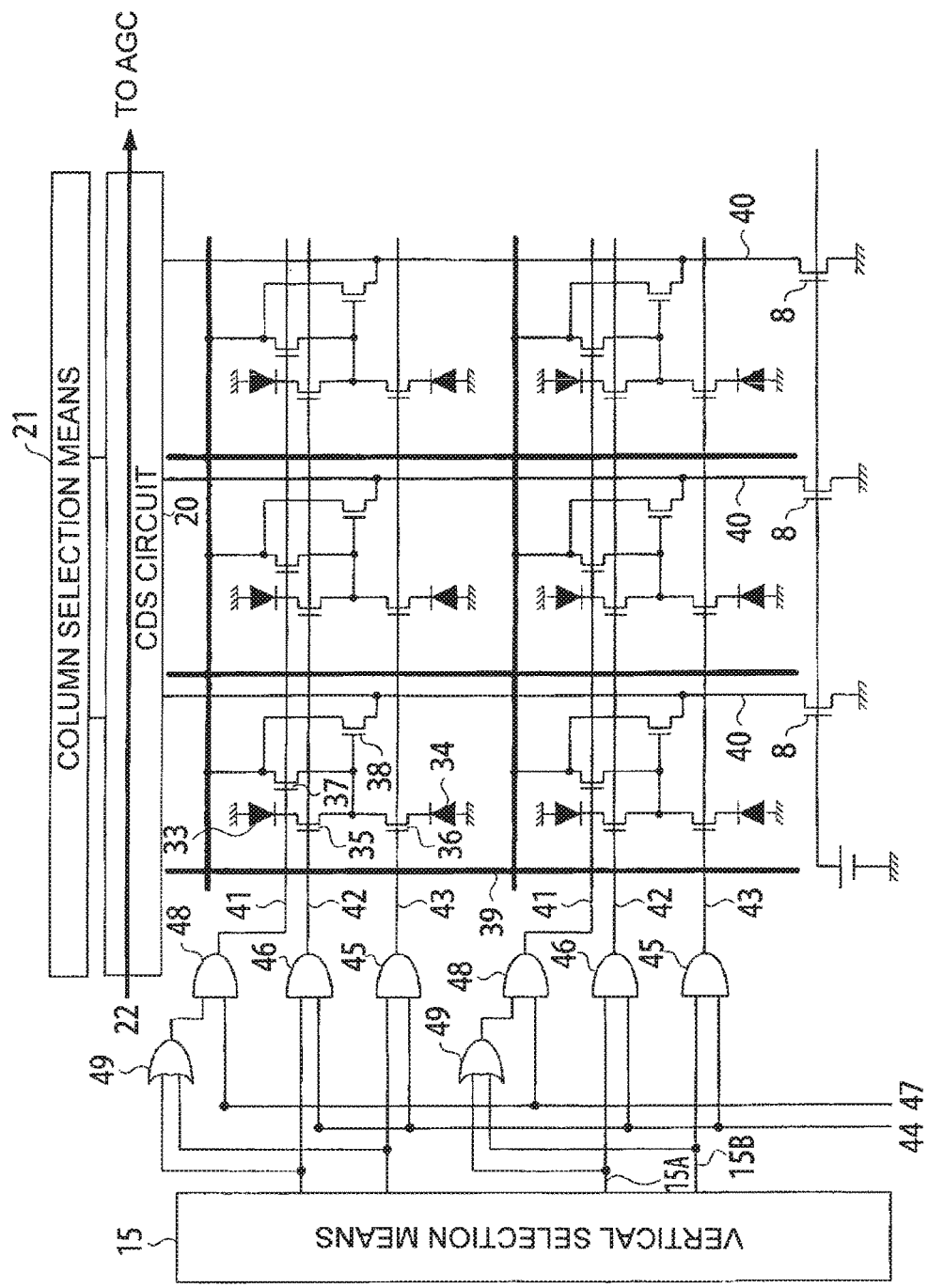
FIG. 2 is a circuit diagram showing the structure of a solid-state imaging device having the pixel structure in FIG. 1.

FIG. 2 is a circuit diagram showing the overall structure of a two-dimensional array in a solid-state imaging device having the pixel structure shown in FIG. 1.

The light receiving surface (two-dimensional pixel block) of the solid-state imaging device has unit cells, each including two pixels, two-dimensionally arranged.

A constant-current supply transistor 8 supplies a constant current to the pixel output line. The constant-current supply transistor 8 supplies a constant current to the amplifying transistor 38 in a selected pixel to cause the amplifying transistor 38 to serve as a source follower, so that a voltage differing from the voltage of the gate electrode of the amplifying transistor 38 by a predetermined value is applied to the pixel output line 40.

A terminal 44 is a pulse terminal through which a transfer pulse is supplied to the transfer signal lines 42 and 43 of each pixel line, and is connected to one input port of a line-selection AND element 45 and one input port of a line-selection AND element 46. Outputs from vertical selection means 15 are supplied to the other input port of the line-selection AND element 45 and to the other input port of the line-selection AND element 46. The output ports of the line-selection AND elements 45 and 46 are connected to the transfer signal line 42 and 43, respectively.

A terminal 47 is a pulse terminal through which a reset pulse is supplied to the reset signal line 41 of each pixel line, and is connected to one input port of a line-selection AND element 48. The output port of the line-selection AND element 48 is connected to the reset signal line 41. An output from an OR circuit 49 is supplied to the other input port of the line-selection AND element 48.

A vertical selection signal line 15A toward an upper pixel line and a vertical selection signal line 15B toward a lower pixel line are connected to the input ports of the OR circuit 49. A waveform resulting from the superimposition of the signals of the upper and lower pixel lines is output from the OR circuit 49.

In other words, each signal pulse is input only to the pixel line selected by the vertical selection means 15. A signal supplied through the pulse terminal 47 is supplied to the gate of the reset transistor 37 upon readout from the pixel lines including the photoelectric converters 33 and 34. A readout operation is performed by driving the full-face signal line 39 along with the above signal lines.

FIGS. 3A to 3D are timing charts showing how the drive signals are supplied when signals are read out from the pixels in the pixel structure according to this embodiment.

The signals supplied to the pixel lines from which signals are to be read out are shown in FIGS. 3A to 3D. A full-face selection signal is supplied to the full-face signal line 39 in FIG. 2, a reset signal is supplied to the reset signal line 41 in FIG. 2, and a transfer signal is supplied to the transfer signal lines 42 and 43 in FIG. 2.

The readout operation will now be described with reference to FIG. 3A.

In an initial state, the reset signal and the transfer signal are set to Low (non-active) and the full-face selection signal is set to High (active).

When the reset signal is changed to High, the voltage at the gate of the amplifying transistor 38 of each pixel is reset to High, like the full-face selection signal. After the reset signal is changed to Low, a voltage corresponding to the reset level is read out to the pixel output line, and the voltage is stored in a CDS circuit.

Next, the transfer signal is changed to High and the electric charge stored in each photoelectric converter is transferred to the gate of the amplifying transistor 38. After the transfer is completed, the transfer signal is changed to Low, and a voltage corresponding to the amount of electric charge stored in each photoelectric converter is read out to the CDS circuit through the pixel output line. The CDS circuit measures the difference between the reset level and the signal level.

After the readout operation is completed, the full-face selection signal is changed to Low and the reset signal is changed to High to reset the input section of the amplifying transistor 38.

When a depression type transistor is used as the reset transistor, the input section of the amplifying transistor 38 can be reset only by changing the full-face selection signal to Low and, thus, waveforms shown in FIG. 3B can be used to drive the solid-state imaging device.

Waveforms shown in FIGS. 3C and 3D are modification of those in FIGS. 3A and 3B. The full-face selection signal is set to High only during the readout operation in FIGS. 3C and 3D.

With the structure described above, the pixel structure can be simplified, compared with known cases.

Figure 11:
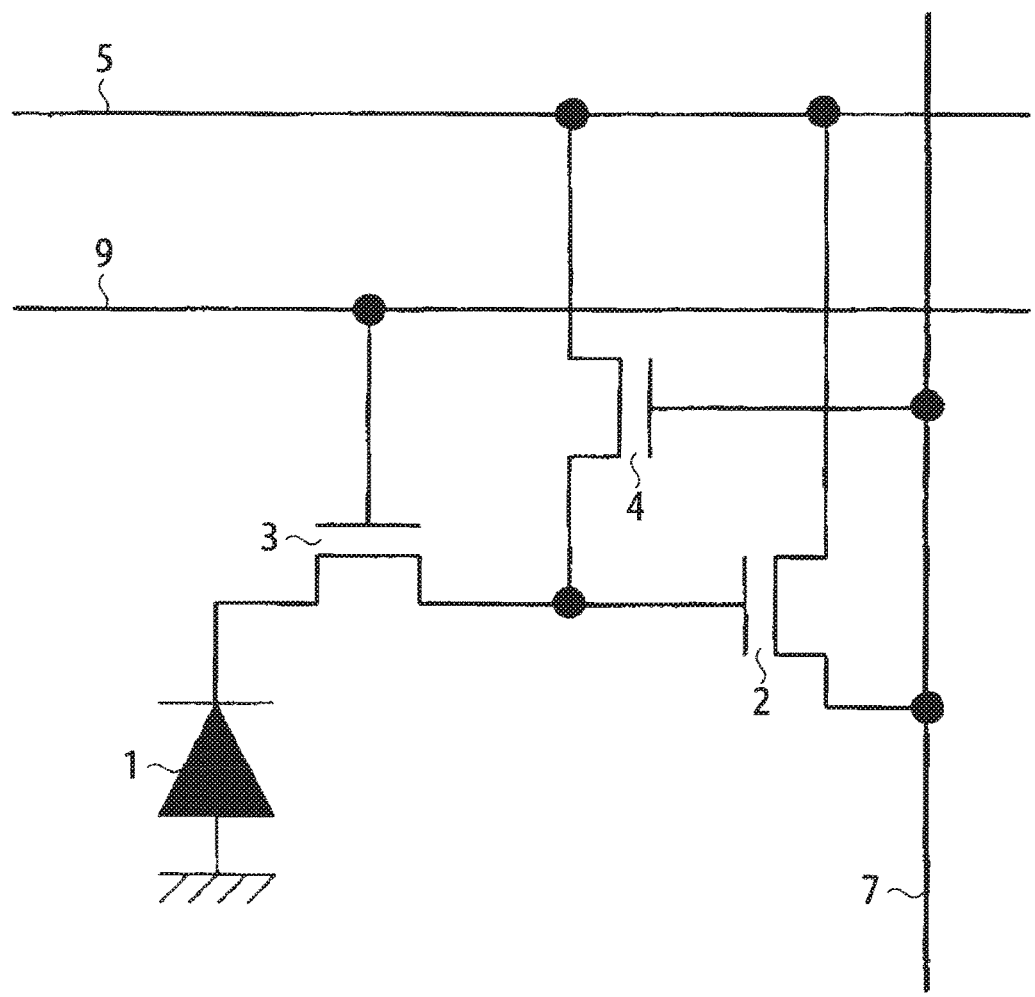
FIG. 11 is a circuit diagram showing a second known pixel structure.

Specifically, the known pixel structure shown in FIG. 11 has three transistors for every pixel, whereas the pixel structure according to the first embodiment has two transistors for every pixel. In addition, the number of the signal lines for every pixel decreases from two to 1.5 (that is, the full-face selection signal also serves as a light shielding film and has an opening corresponding to the light receiving surface for every pixel, like the light shielding films of well-known solid-state imaging devices).

Since capacitors are formed only in predetermined pixels in related arts, the pixels having the capacitors formed therein differ from the pixels having no capacitors formed therein in the sensitivity and the number of saturation signals. In contrast, there is no need to form the capacitors for externally reading out the signals in the structure according to this embodiment because the reset level of the input section of the amplifying transistor is controlled by using the full-face signal line, thus resolving the above problem.

Figure 12:
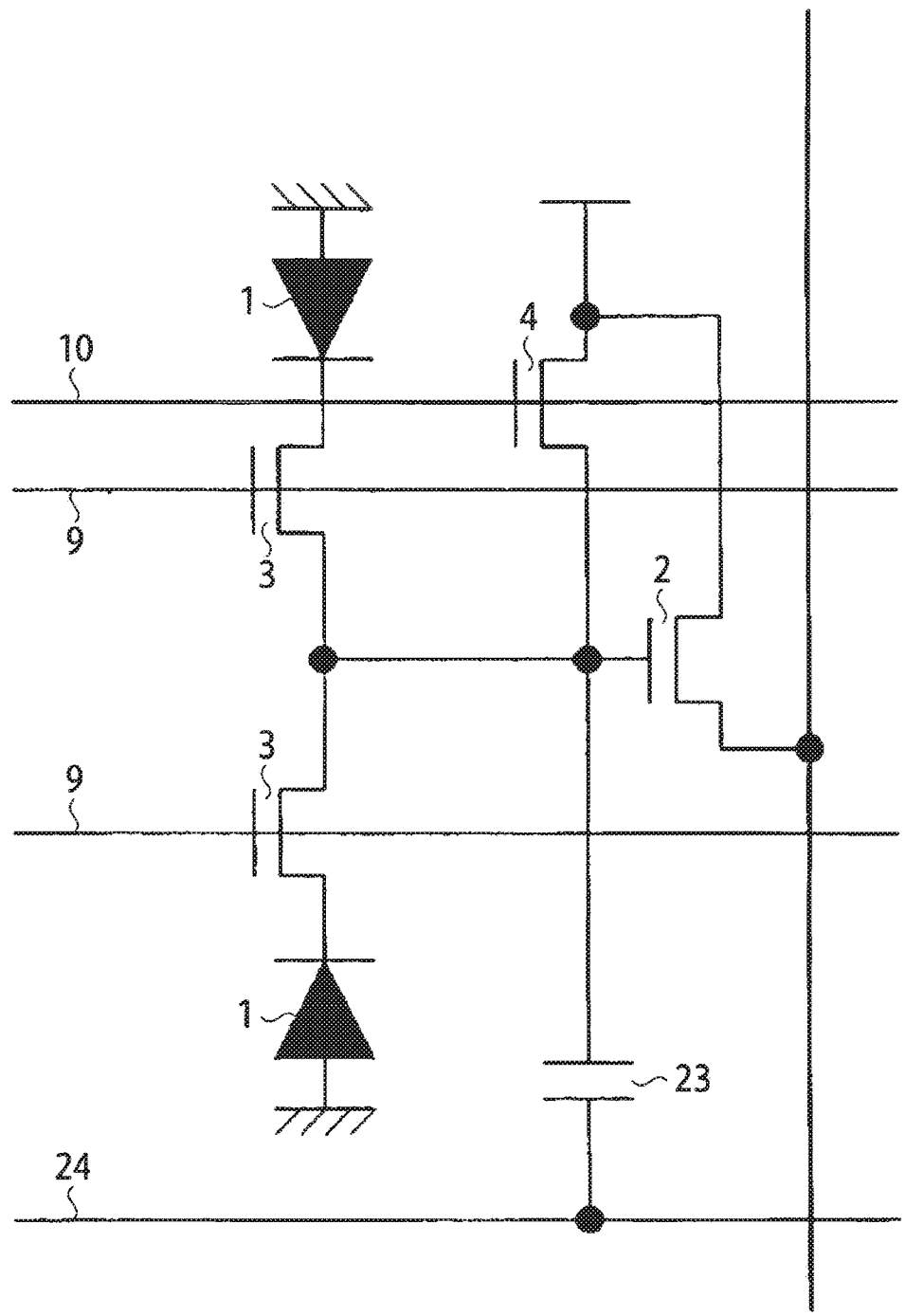
FIG. 12 is a circuit diagram showing a third known pixel structure.

Furthermore, compared with the structure in the related art, shown in FIG. 12, there is no capacitance except for a parasitic capacitance and the number of the signal lines for every pixel decreases from two to 1.5, so that it is possible to further reduce the pixel size.

Second Embodiment

Since the methods of sharing the amplifying transistor and the reset transistor between the two photoelectric converters, shown in the known example in FIG. 12 and the structure according to the first embodiment (FIG. 1) described above, can decrease the number of the transistors and the number of the signal lines for every pixel, such methods are useful in terms of the reduction of the pixel size. However, as described above as the problem of the related arts, it is extremely difficult to make the shapes and characteristics of the upper photoelectric converter and transfer gate identical to those of the lower photoelectric converter and transfer gate. Hence, when the unit cells are arranged in the two-dimensional array and the Bayer color filter is used, the G pixels in the RG lines differ from the G pixels in the GB lines in the pixel characteristics because the two G filters are diagonally adjacent to each other.

Figure 4:
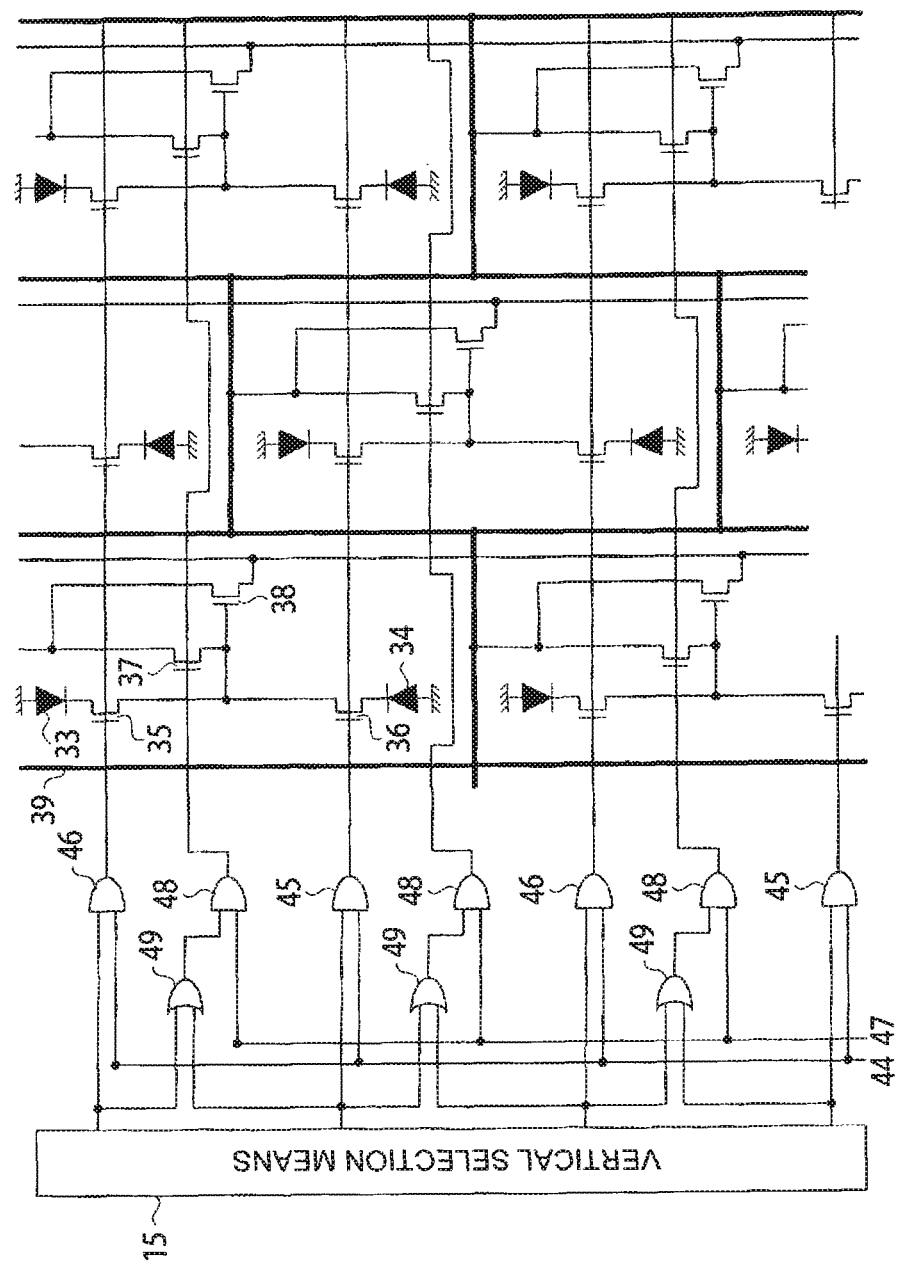
FIG. 4 is a circuit diagram showing the structure of a solid-state imaging device according to a second embodiment of the present invention.

According to the second embodiment, the unit cells in FIG. 1 are vertically shifted from each other by one pixel for every column, as shown in FIG. 4. Since the structure in FIG. 4 is the same as that in FIG. 2 except that the arrangement of the unit cells is varied and that the control lines are connected to different elements for every line, the same reference numerals are used in FIG. 4 to identify the same elements shown in FIG. 2 and a description of such elements is omitted here.

With the arrangement in FIG. 4, the number of signal lines for every pixel increases from 1.5 to two. However, the G pixels in the R lines have the same shape as the G pixels in the B lines, so that it is possible to eliminate the difference, expected in the case in FIG. 1, in characteristics of the G pixels between the pixel lines.

Specifically, for example, the transfer transistors are arranged in the pixels corresponding to the G pixels in the R lines and to the G pixels in the B lines such that the electric charge is read out from the respective photoelectric converters in the same direction. Accordingly, the effect of the potential of an impurity region in the transfer transistor on the potential of the photoelectric converter occurs in approximately the same position in the photoelectric converter and, therefore, there is no variation in the sensitivity and the number of saturation signals in the photoelectric converter.

Although the case in which the transistors are shared between the two pixels and the unit cells are vertically shifted from each other by one pixel for every column is exemplified in FIG. 4, the second embodiment is also applicable to cases in which the number of pixels is changed or in which the unit cells are shifted from each other by a different amount.

Third Embodiment

Figure 5:
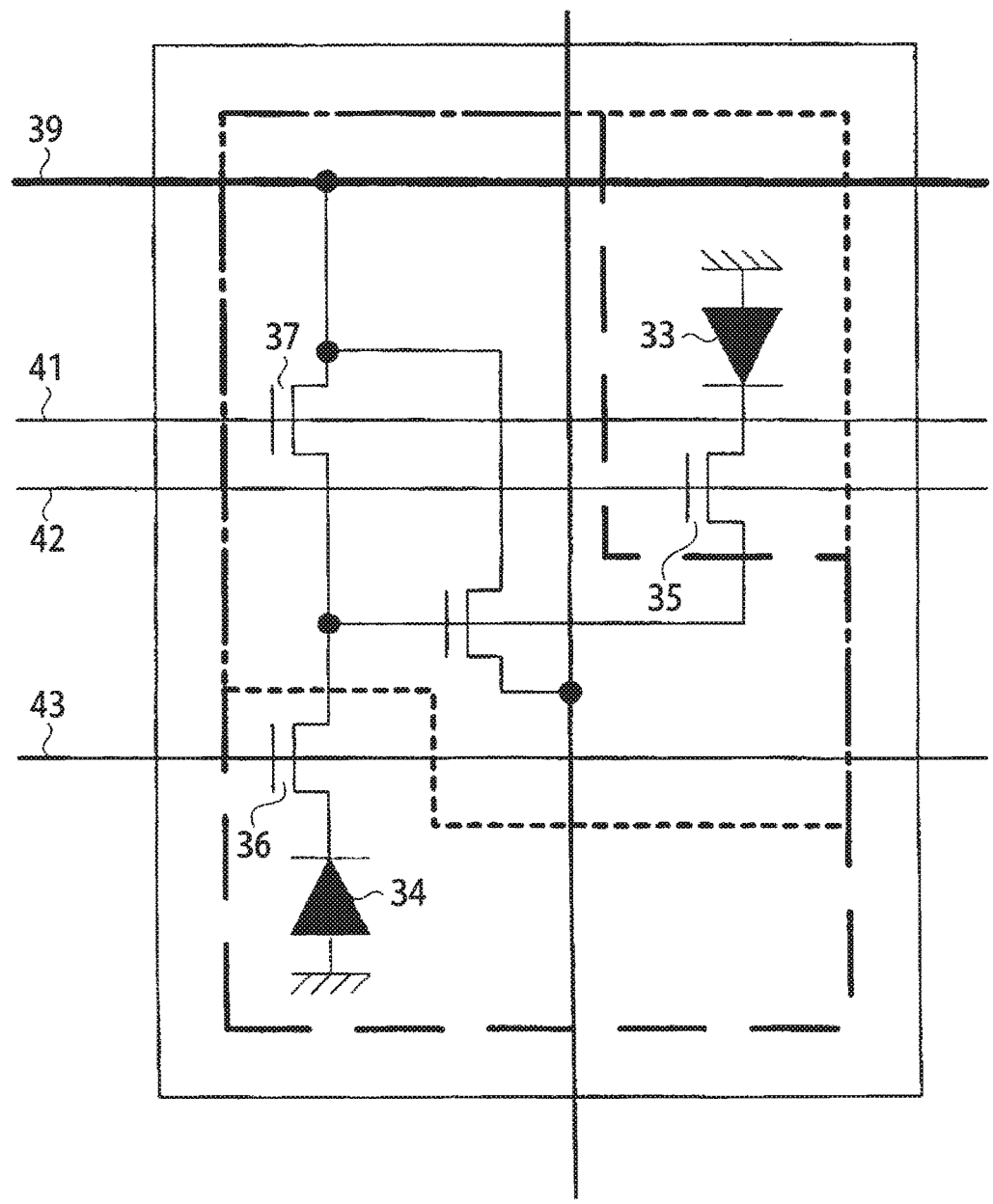
FIG. 5 is a circuit diagram showing a pixel structure according to a third embodiment of the present invention.

FIG. 5 is a circuit diagram showing a pixel structure according to a third embodiment of the present invention. A case in which the reset transistor, the amplifying transistor, the reset signal line, and the full-face signal line are shared between the two diagonally adjoining photoelectric converters is exemplified in FIG. 5. Since the structure in FIG. 5 has the same elements as that in FIG. 1 and only the arrangement is varied, the same reference numerals are used in FIG. 5 to identify the same elements shown in FIG. 1 and a description of such elements is omitted here.

When the Bayer color filter is used in the light receiving section having such unit cells arranged therein, the signals are output in the order shown in FIG. 6B.

Since the signals are output in a manner shown in FIG. 6A in a normal pixel structure, a process of shifting the signals in FIG. 6B by one pixel in odd-numbered lines or even-numbered lines is necessary to support normal signal processing and a normal output format.

As described in the related arts, the signal is normally read out from each pixel to the CDS circuit for every line and, then, the signal in a column selected by the column selection means passes through the horizontal signal line and is processed in, for example, the downstream AGC to be extracted.

Figure 13:
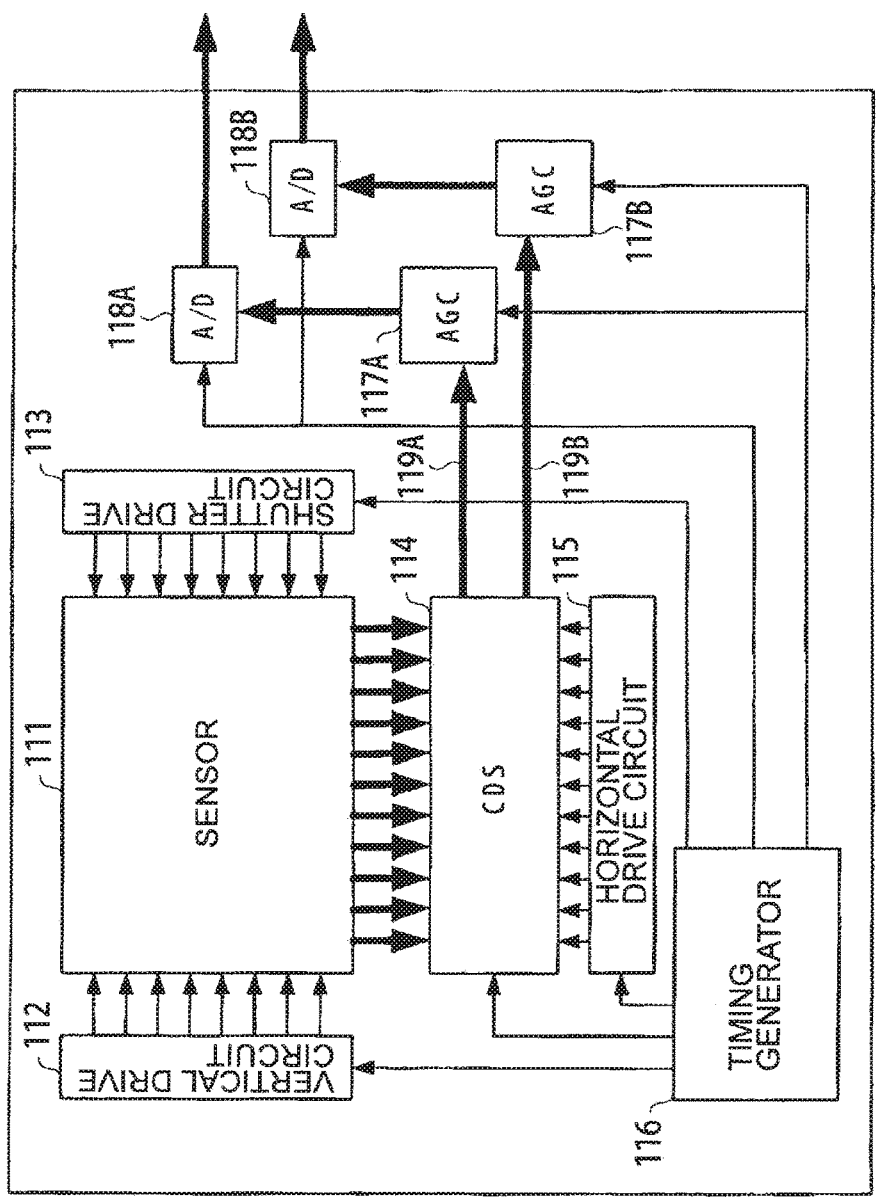
FIG. 13 is a circuit diagram showing the structure of a known solid-state imaging device having two output systems.

Furthermore, as described with reference to FIG. 13, dividing one output system, as in known cases, into multiple output systems and reading out the outputs in parallel from the pixels allows the images to be sampled at high speed.

Figure 14:
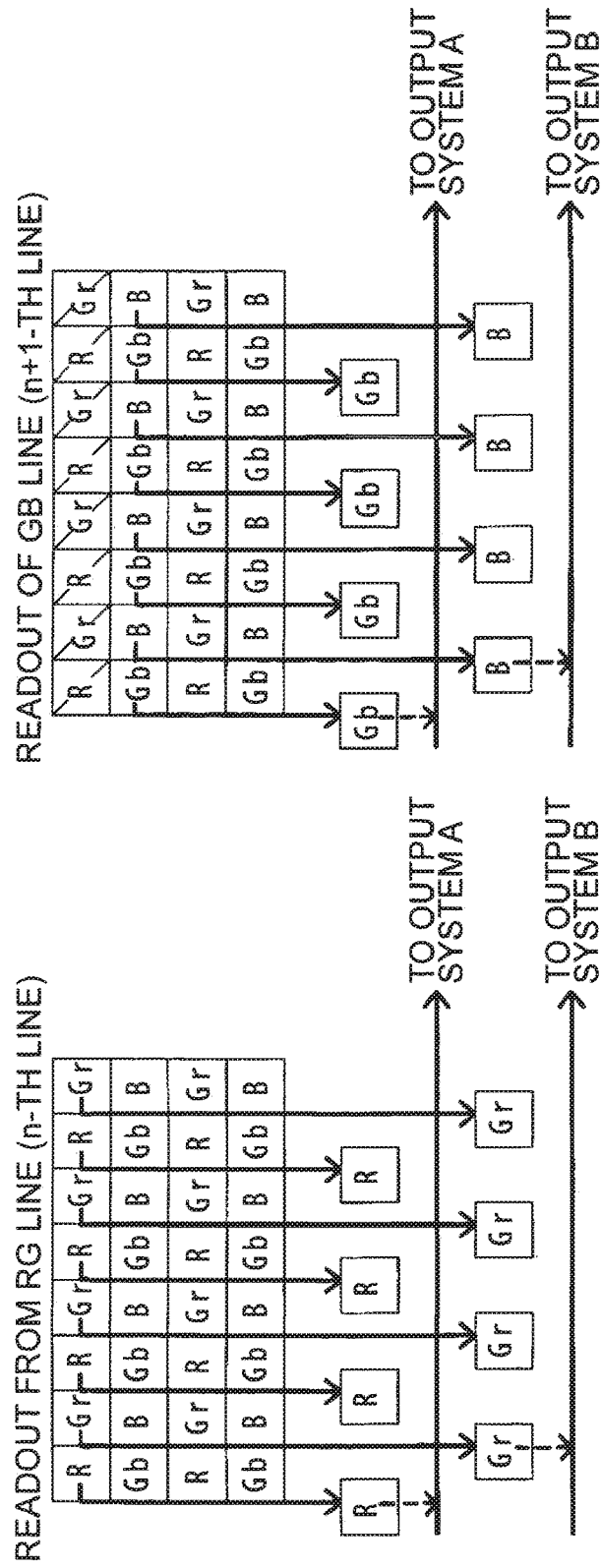
FIG. 14 illustrates the readout operations of signals in the solid-state imaging device in FIG. 13.

However, with the multiple output systems, there are problems in that the circuit area is increased and the variation in the characteristics between the output systems occurs. Particularly, when color coding in the Bayer format is performed, the G pixels in the RG lines differ from the G pixels in the GB lines in gain because of the use of different processing systems, possibly resulting in horizontal stripes. This is described in detail with reference to FIG. 14.

Figure 7:
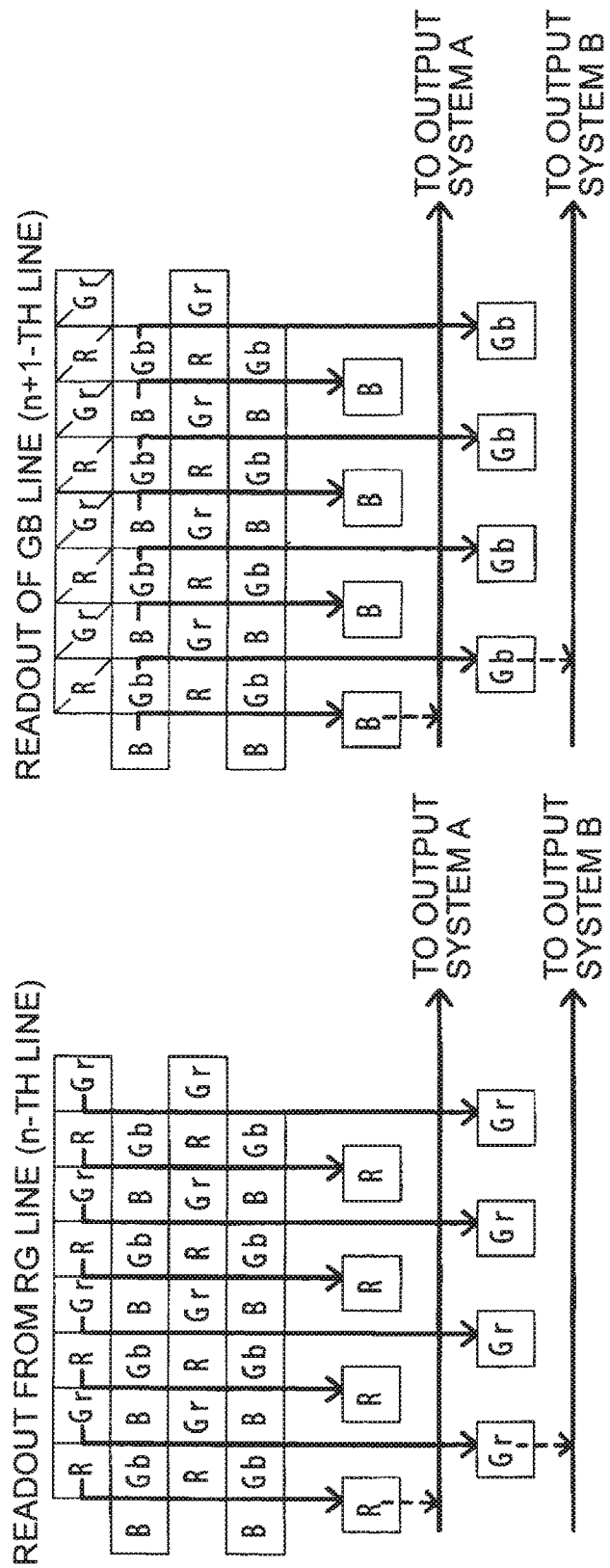
FIG. 7 illustrates operation examples when the signals are read out to two output systems in the pixel structure in FIG. 5.

In contrast, the reset transistor, the amplifying transistor, the reset signal line, and the full-face signal line are shared between the two diagonally arranged pixels, as shown in FIG. 5, in the third embodiment of the present invention. Accordingly, as shown in FIG. 7, the signals are read out from the R pixels through the same pixel output line and, thus, the outputs from the G pixels can be processed in the same output system. Consequently, it is possible to sample the images at double speed, compared with known cases having one output system, while the signals are extracted from the G pixels in each line through the same output system.

Figure 8:
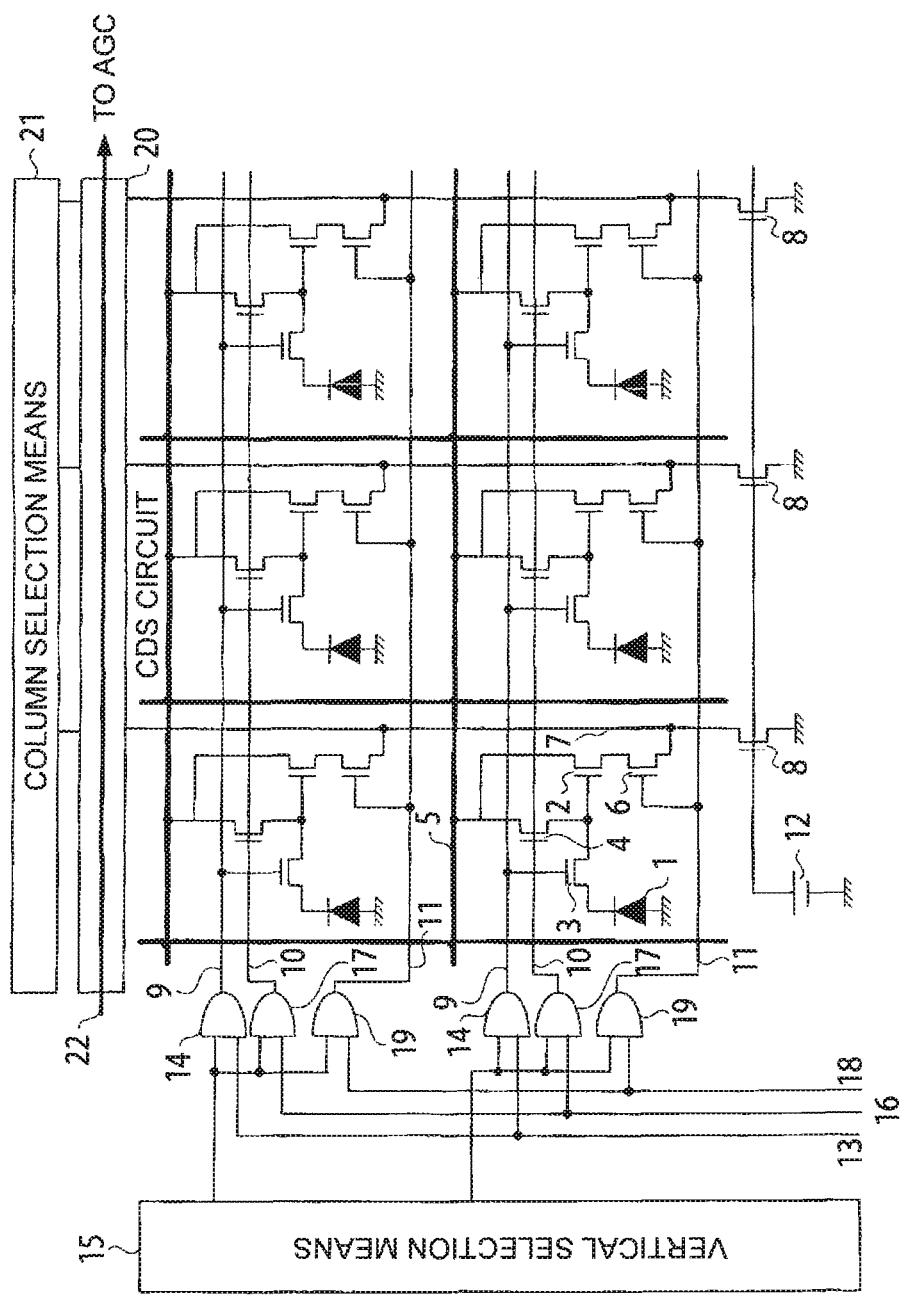
FIG. 8 is a circuit diagram showing the structure of a solid-state imaging device having a first known pixel structure.
Figure 9:
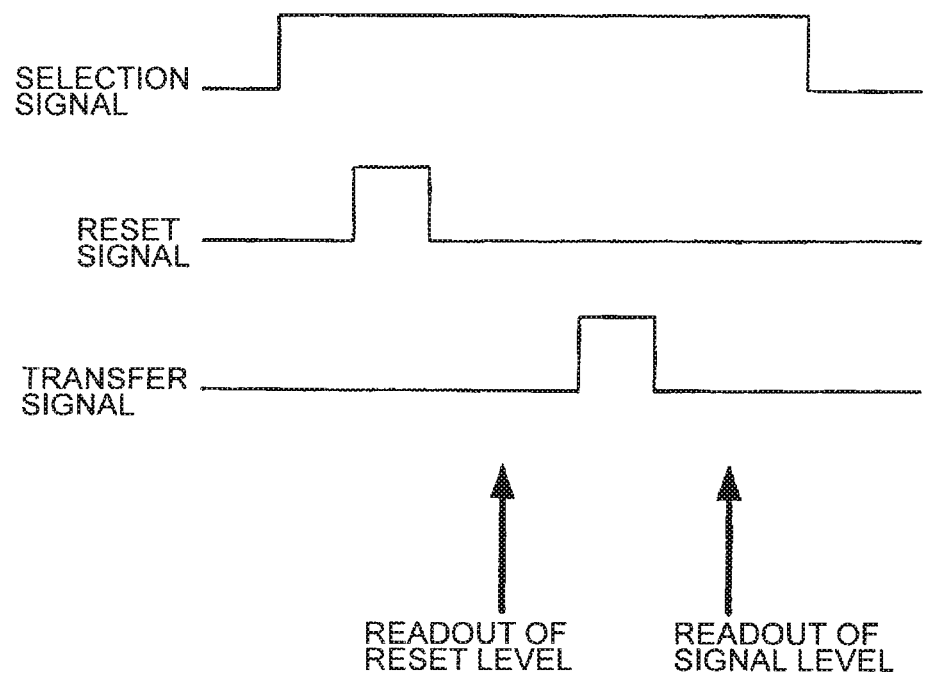
FIG. 9 is a timing chart showing examples of drive signals in the pixel structure in FIG. 8.

Although the case in which the transistors are shared between the two pixels is exemplified in the third embodiment, the third embodiment is applicable to cases in which the number of pixels sharing the transistors is changed or in which the pixels are shifted from each other by an amount smaller than one pixel. The third embodiment is also applicable to the pixel structures shown in FIGS. 8 and 12 and other pixel structures.

Figure 10:
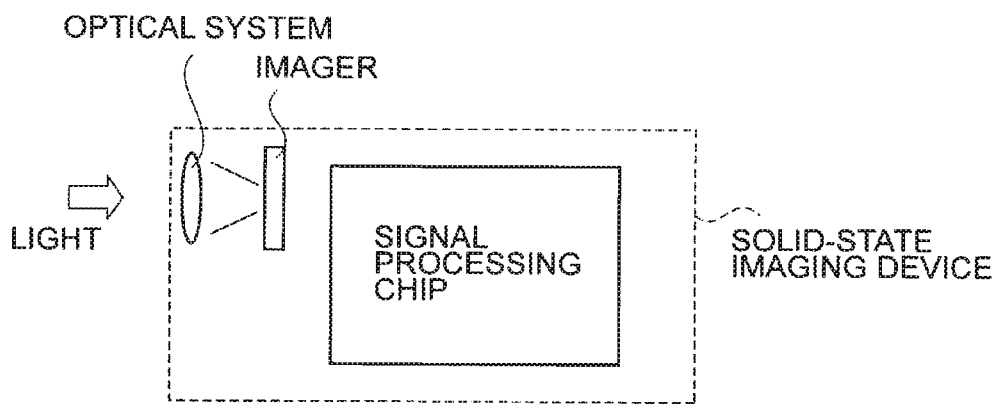
FIG. 10 illustrates a module-type solid-state imaging device.

The solid-state imaging device of the present invention may include a structure other than the structures described above. For example, the present invention is embodied by a camera-module-type solid-state imaging device combined with an optical system and a signal processing chip, shown in FIG. 10.

There is substantially no difference between lines and columns in the two-dimensional array of pixels and between the vertical direction and the horizontal direction. For example, the pixel lines can be the pixel columns or vice versa, depending on the direction in which the solid-state imaging device is viewed, as long as the pixels are arranged in two directions substantially orthogonal to each other.

According to the embodiments of the present invention described above, the following advantages are achieved.

First Embodiment

Sharing the transistors between the pixels and using the full-face signal line as one of the signal lines can greatly decrease the number of transistors and the number of signal lines for every pixel, thus possibly further reducing the pixel size.

Second Embodiment

The problem of sharing of the transistors between pixels, that is, the difference in the characteristics between the pixels filtered in the same color, which difference is caused by the use of pixels having different shapes, can be resolved by changing the arrangement of the unit cells to give the same shape to all the pixels filtered in the same color.

Although the case in which the unit cells, including the two vertically adjoining pixels sharing the transistors, are vertically shifted from each other by one pixel for every column in the imaging surface filtered in the Bayer format is exemplified, the method of devising the arrangement of the unit cells to give the same shape to the pixels filtered in the same color is applicable to other color filtering methods and other pixel structures. Furthermore, depending on the structure, shifting the unit cells by an amount smaller than one pixel is possibly preferable to shifting them by just one pixel.

Third Embodiment

When the signals are read out from the pixels in the imaging surface filtered in the Bayer format through the two divided output systems, the pixels filtered in the same color (the G pixels in the RG lines and the G pixels in the GB lines) are read out through the different output systems in a normal pixel structure. As a result, the variation in the characteristics between the output systems can result in horizontal stripes. The same problem is caused in the case in which the two vertically adjoining pixels share the transistors. In contrast, according to the third embodiment, sharing the transistors between the two diagonally adjoining pixels allows the outputs from the Gr pixels and Gb pixels to be read out through the same output system. Hence, the structure according to the third embodiment is not affected by any variation in the process occurring between the output systems and, therefore, it is possible to sample the images at double speed, compared with the cases using one output system.

As described above, according to the solid-state imaging device of the present invention, sharing the transistors between the pixels and using the full-face signal line can decrease the number of transistors and the number of signal lines for every pixel, thus reducing the pixel size.

Furthermore, with respect to the difference in characteristics between the pixels having different shapes and the difference in gain between the two output systems, which are problem of sharing the transistors between the pixels, devising the arrangement of the unit cells or sharing the transistors between the two diagonally adjoining pixels can narrow the difference in the characteristics of the signals between the pixels, particularly between the pixels filtered with the G filter.

What is claimed is:

1. An imaging device comprising a plurality of pixel units, at least one of the pixel units including:
 a first photoelectric converter;
 a second photoelectric converter;
 a first transfer transistor;
 a second transfer transistor;
 a reset transistor;
 an amplifying transistor;
 a selection transistor; and
 a connecting node configured to receive a first electric charge from the first photoelectric converter through the first transfer transistor, and a second electric charge from the second photoelectric converter through the second transfer transistor,
 wherein a gate of the amplifying transistor is connected to the connecting node,
 wherein the selection transistor is connected between the amplifying transistor and a vertical signal line,
 wherein the reset transistor is configured to connect a voltage line to the gate of the amplifying transistor, and
 wherein the voltage line includes openings corresponding to each of the pixel units.

2. The imaging device of claim 1, wherein the voltage line is connected to the plurality of pixel units.

3. The imaging device of claim 1, wherein the connecting node is arranged between the first photoelectric converter and the second photoelectric converter in a plan view.

4. The imaging device of claim 1, wherein the connecting node is arranged between the first transfer transistor and the second transfer transistor in a plan view.

5. The imaging device of claim 1, wherein the first photoelectric converter is diagonally adjacent to the second photoelectric converter across the vertical signal line in a plan view.

6. The imaging device of claim 1, wherein the first transfer transistor is diagonally adjacent to the second transfer transistor across the vertical signal line in a plan view.

* * * * *